United States Patent
Tan et al.

(10) Patent No.: US 10,388,328 B1
(45) Date of Patent: Aug. 20, 2019

(54) STORAGE DEVICE BREATHING STRUCTURE

(71) Applicant: Seagate Technology LLC, Cupertino, CA (US)

(72) Inventors: Tai Zen Tan, Singapore (SG); Lihong Zhang, Singapore (SG); Xiong Liu, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/946,816

(22) Filed: Apr. 6, 2018

(51) Int. Cl.
| G11B 33/14 | (2006.01) |
| B01D 46/00 | (2006.01) |
| G11B 25/04 | (2006.01) |

(52) U.S. Cl.
CPC ...... G11B 33/1466 (2013.01); B01D 46/0036 (2013.01); G11B 25/043 (2013.01); G11B 33/146 (2013.01); G11B 33/148 (2013.01); G11B 33/1486 (2013.01)

(58) Field of Classification Search
CPC ............ G11B 33/1466; G11B 33/1486; G11B 33/146; G11B 33/148; G11B 25/043; B01D 46/0036

See application file for complete search history.

(56) References Cited

U.S. PATENT DOCUMENTS

| 6,296,691 | B1 | 10/2001 | Gidumal | |
|---|---|---|---|---|
| 6,519,111 | B2 | 2/2003 | Hirasaka et al. | |
| 6,618,222 | B1 | 9/2003 | Watkins et al. | |
| 6,683,746 | B1 | 1/2004 | Kuroki et al. | |
| 6,712,887 | B2 | 3/2004 | Ueki et al. | |
| 7,274,534 | B1* | 9/2007 | Choy | G11B 25/043 360/97.18 |
| 7,369,356 | B2 | 5/2008 | Iwase et al. | |
| 7,382,572 | B1* | 6/2008 | Turner | G11B 33/146 360/97.16 |
| 7,486,474 | B2 | 2/2009 | Shin et al. | |
| 7,986,490 | B2 | 7/2011 | Hirono et al. | |
| 8,254,056 | B2 | 8/2012 | Ichikawa et al. | |
| 8,705,202 | B2 | 4/2014 | Hirono et al. | |
| 8,776,832 | B2 | 7/2014 | Tuma | |
| 8,797,676 | B2 | 8/2014 | Maeda | |
| 8,934,194 | B2 | 1/2015 | Schreck | |
| 9,183,889 | B1* | 11/2015 | Smyth | G11B 25/043 |
| 2004/0168575 | A1* | 9/2004 | Isogawa | B01D 46/0032 96/134 |
| 2005/0219740 | A1* | 10/2005 | Repphun | G11B 33/121 360/97.18 |

* cited by examiner

*Primary Examiner* — Brian E Miller
(74) *Attorney, Agent, or Firm* — Westman, Champlin & Koehler, P.A.

(57) ABSTRACT

A valve apparatus for a storage device includes a tab configured to couple to an enclosure and a flap coupled to the tab by a flexure. The flap is configured to regulate airflow through a breather hole of the enclosure. The flap includes an opening configured to reduce airflow into the enclosure when the flap is in a closed position.

19 Claims, 4 Drawing Sheets

STORAGE DEVICE BREATHING STRUCTURE

SUMMARY

In one embodiment, a valve apparatus includes a tab configured to couple to an enclosure and a flap coupled to the tab by a flexure. The flap is configured to regulate airflow through a breather hole of the enclosure.

In another embodiment, an apparatus includes a breather hole disposed on a data storage enclosure. A valve is configured to regulate airflow through the breather hole and an opening disposed on the valve enables airflow from an exterior of the data storage enclosure to an interior of the data storage enclosure.

In yet another embodiment, a method is provided. The method includes providing an enclosure configured to maintain atmospheric equilibrium between an interior environment and exterior environment through a breather hole. The method also includes providing a valve configured to regulate airflow through the breather hole of the enclosure. Other features and benefits that characterize embodiments of the disclosure will be apparent upon reading the following detailed description and review of the associated drawings.

DETAILED DESCRIPTION

Figure 1A:
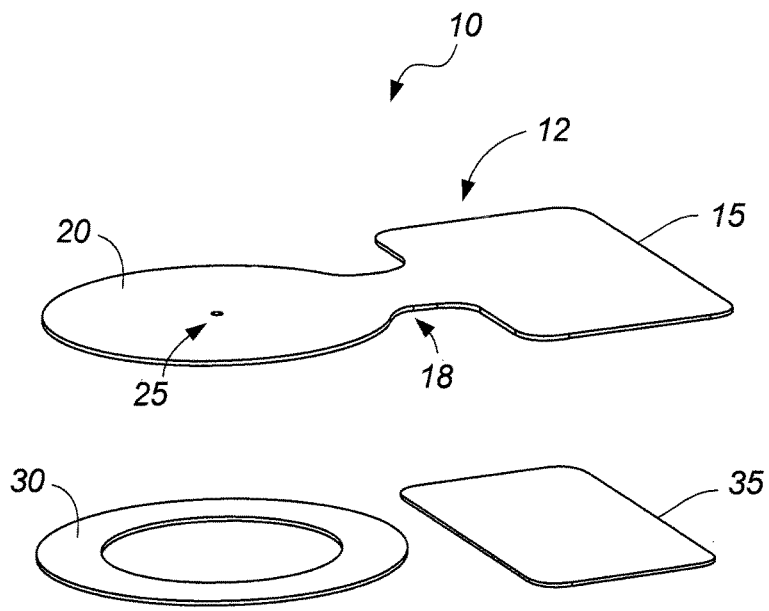
FIGS. 1A and 1B are schematic illustrations of a valve apparatus according to an embodiment of the disclosure

Although the present disclosure has been described with reference to embodiments, workers skilled in the art will recognize that changes may be made in form and detail without departing from the scope of the disclosure. The present disclosure generally relates to an apparatus to regulate airflow in data storage devices through a breather hole.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Data storage devices, such as a hard disk drive ("HDD") may include various components to store and retrieve digital information such as data storage media (e.g., recording disks) on a spindle, an actuator assembly with heads for reading data from and/or writing data to the data storage media, and various circuit boards and connections. These components are contained within an enclosure such as a case or base. To store and retrieve digital information, data storage devices support the heads at a flying height above the recording disks and rely on air density inside the enclosure to operate properly. Due to the close spacing between the head and the disk's surface during operation, data storage devices are vulnerable to being damaged by the head contacting data storage material on the disk, e.g., a head crash. A head crash may be caused by electronic failure, power failure, physical shock, corrosion, and other vulnerabilities, such as contamination of the data storage device's internal enclosure by the outside environment. If air density in the internal enclosure is too low, the heads will not have lift for the desired flying height and the risk of a head crash and data loss will increase.

The enclosure of a data storage device includes a small hole, or breather hole, through the enclosure to connect the external environment with the internal environment. The breather hole may maintain atmospheric equilibrium between the interior and exterior of the enclosure. The breather hole may also aid data storage devices to avoid internal pressure escalation when device temperature increases during use. Breather hole structure may be kept neutral against air flow, such that it introduces air from the exterior to the interior as much as it expels air from the interior to the exterior. A breather filter is provided on the interior of the enclosure covering the breather hole to remove contaminates, such as particles or chemicals, from the external environment, and to help maintain a clean and dry interior environment.

When a storage device is powered on, internal pressure increases due to the rise in temperature, and air is expelled through the breather hole to quickly maintain pressure equilibrium. When the storage device is powered off, the temperature decreases and the flow of air reverses as the internal pressure decreases. The absorption capacity of a breather filter, such as a carbon filter, is limited by the size and weight of the absorption materials, and the size of a filter is limited by space constraints in the enclosure. Further, a breather filter may lose effectiveness in hot and humid environments. Loss of absorption capacity may also occur due to moisture absorption when under a fast air exchange. Thus, repetitive rapid air exchange through the breather hole may be detrimental to the effectiveness and longevity of the breather filter. As a breather filter fails, the risk of a head crash and data loss increases.

This disclosure describes a valve apparatus placed over a breather hole to enable a storage device to quickly reach pressure equilibrium when internal pressure is high, but to reduce gas exchange when internal pressure is low. Reducing the amount and rate of air passing through the breather filter may extend the breather filters' absorption capacity and reduce contamination of the enclosure's interior.

Figure 1B:
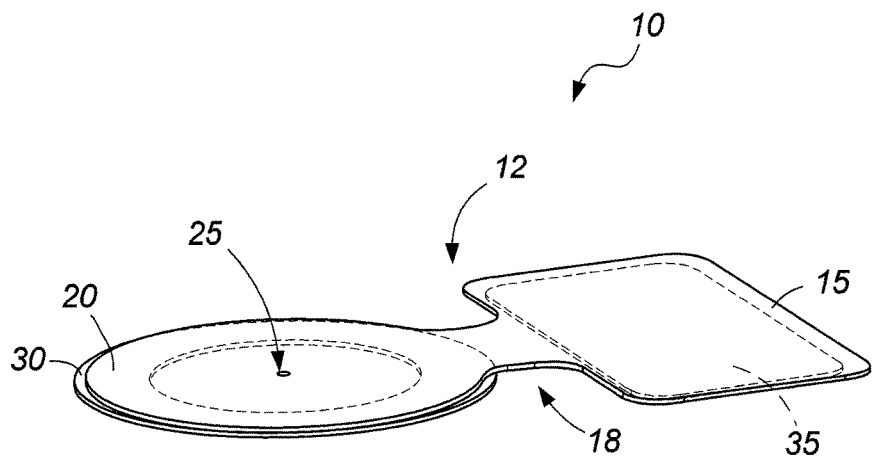

FIGS. 1A and 1B illustrate a valve apparatus 10 for regulating air flow through a breather hole in a storage device. FIG. 1A illustrates valve apparatus 10 in an exploded view. Valve apparatus 10 comprises a frame or valve body 12 which includes a tab 15 coupled to a flipping front or flap 20 by a flexure 18. The flap 20 includes an opening or hole 25 which may be centrally located. A pad 35 is included which may couple the tab 15 to an exterior surface of a base or enclosure 40 (FIGS. 3 and 4). A gasket 30 may be coupled to the flap to provide a seal between the flap 20 and the enclosure 40 when the valve apparatus 10 is in a closed position. The flexure 18 provides a flexible element between tab 15 and flap 20 and enables bending or pivoting.

FIG. 1B illustrates a bottom view of valve apparatus 10 in a completed form. As can be seen, gasket 30 is coupled to the bottom side of valve apparatus 10 and surrounds the outer edge of flap 20 while leaving hole 25 open. Pad 35 is coupled to the bottom side of tab 15. In one example, tab 15 is formed in a rectangular shape with rounded edges and flap 20 is formed in a circular or rounded shape. Tab 15 and flap 20 are coupled by flexure 18 formed in a narrow shape or neck. In one example, frame 12 is formed by tab 15 and flap 20 coupled by flexure 18 in a solid piece, however, this illustration is exemplary only, and frame 12 may be formed as separate elements coupled by a flexure 18 to comprise a valve apparatus for a breather hole 45 (seen in FIG. 3A). Although tab 15, and flap 20 are illustrated as having square and circular shapes respectively, these are merely representational, and one skilled in the art may recognize that a valve apparatus for a breather hole may comprise a variety of shapes and sizes without departing from the scope of the disclosure.

Figure 2:
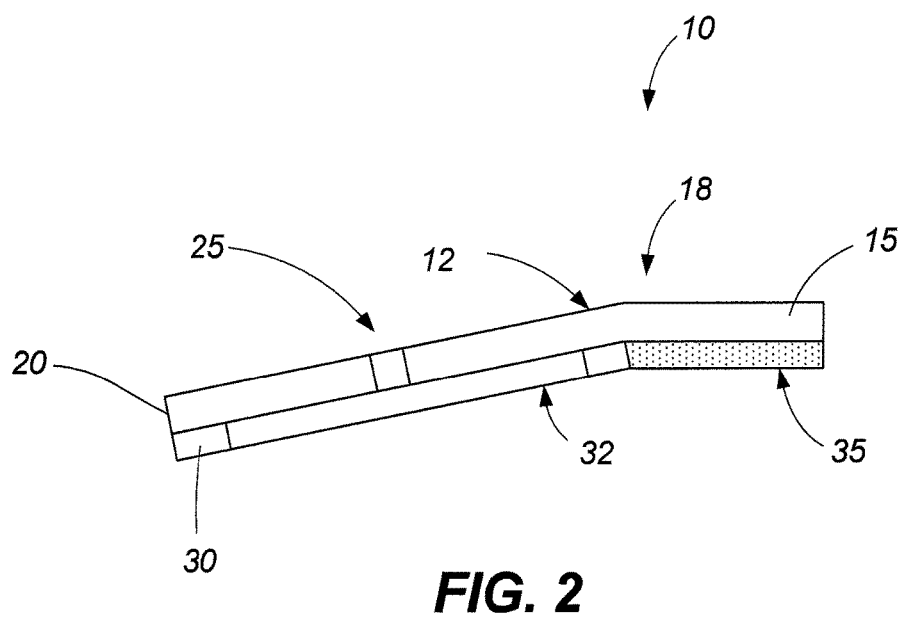
FIG. 2 is a side view illustration of a valve apparatus according to an embodiment of the disclosure.
Figure 3A:
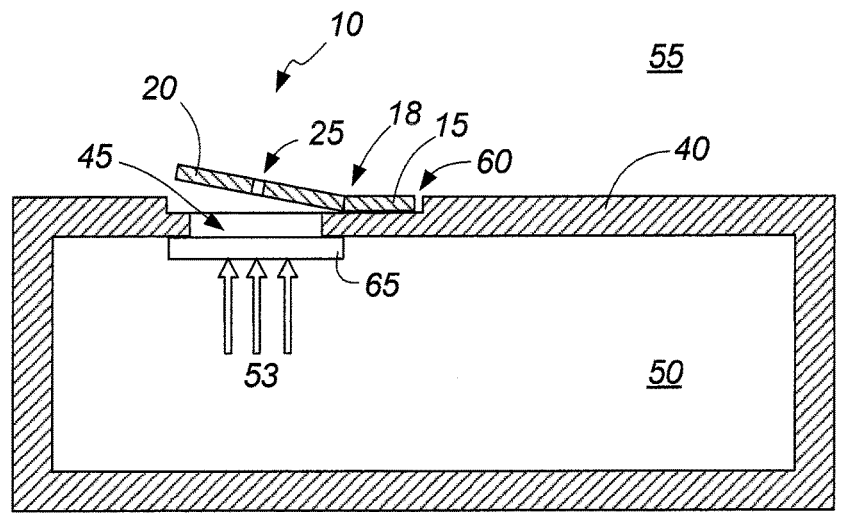
FIGS. 3A and 3B are schematic illustrations of a valve apparatus according to an embodiment of the disclosure.
Figure 3B:
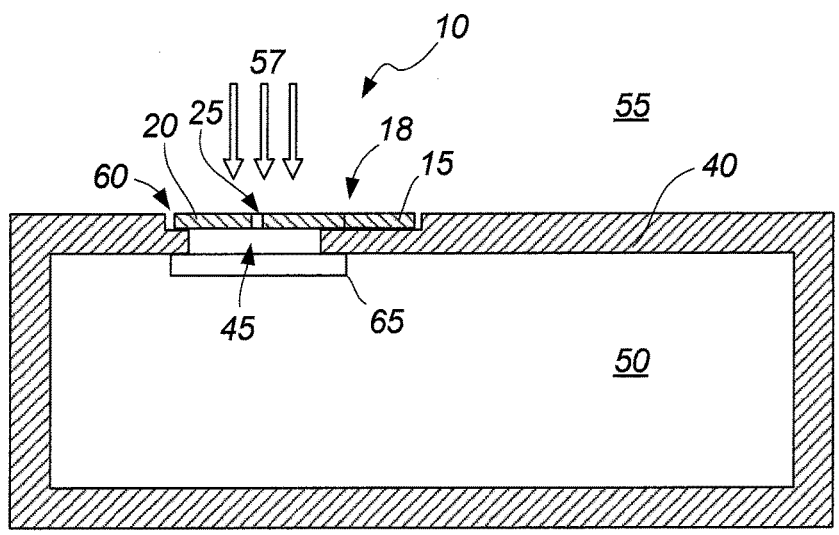

FIG. 2. Illustrates a side view of the apparatus of the present disclosure. Valve apparatus 10 includes frame or valve body 12 which may be coupled to a storage device enclosure 40 (as seen in FIGS. 3A and 3B) by tab 15 through pad 35. Flap 20 is coupled to tab 15 by flexure 18, shown illustratively here in a bent or pivoted position. Gasket 30 is coupled to the underside of flap 20 from an outer edge of flap 20 to an inner circumference to form a cavity 32 beneath opening 25. Cavity 32 provides a seal between flap 20 and enclosure 40 when valve apparatus 10 is in a closed position. Cavity 32 may correspond in size and shape with breather hole 45 (as seen in FIGS. 3A and 3B). Gasket 30 may provide a soft layer and enables a seal between flap 20 and the surface of enclosure 40 over breather hole 45. Hole 25 in flap 20 is a small opening, or pre-load hole, in the flap 20 that connects the external environment through valve apparatus 10 with the internal environment of the enclosure 40. Gasket 30 forms cavity 32 such that hole 25 in flap 20 remains unobstructed and provides a clear air passageway between the external environment and the internal in environment of the enclosure 40 when flap 20 is in a closed position. Hole or opening 25 may be smaller than breather hole 45 and enables gas exchange between the external and internal environments when valve apparatus 10 is in a closed position. Because opening 25 is smaller than breather hole 45, a smaller amount of air may flow, e.g., the rate of airflow will decrease, from the external environment to the internal environment when valve apparatus 10 is in a closed position than when valve apparatus 10 is in an open position. Breather holes vary in size, and may, for example, range in size from 1 millimeter to 2.5 millimeters in diameter. Opening 25 may be configured in a plurality of sizes to achieve different rates of gas exchange. In one embodiment, the opening 25 may vary in size from $1/20^{th}$ to $1/5^{th}$ of the diameter of the breather hole 45. Thus, even when valve apparatus 10 is in a closed position against enclosure 40, the breather hole 45 may maintain atmospheric equilibrium between the interior and exterior of the enclosure.

Valve apparatus 10 may be a membrane valve. Frame 12 (as seen in FIGS. 1 and 2) formed by tab 15 and flap 20 coupled by flexure 18 may be formed in a solid piece, and thus with the same material, however, valve apparatus 10 may be formed as separate pieces or in a plurality of different materials without departing from the scope of the disclosure. Thus, the components of valve apparatus 10, such as tab 15 and flap 20 coupled by flexure 18, may include the same materials or different materials. Valve apparatus 10 may be formed of a variety of materials, such as stainless steel, plastics, e.g., PET, or plastic metal laminates. Pad 35 is illustratively embodied as a structure herein, but embodiments need not be so limited, and pad 35 may be comprised of a variety of materials or bonding processes, such as an adhesive, adhesive tape, or weld, to couple tab 15 to the enclosure 40. Gasket 30 may be comprised of a variety of materials, such as rubber, to form a soft layer to provide a seal between flap 20 and enclosure 40 surrounding the breather hole 45.

FIGS. 3A and 3B illustrates an embodiment of valve apparatus 10 coupled to enclosure 40 to provide air-flow selectivity. FIGS. 3A and 3B have been simplified and are merely representational of an operating environment of the disclosure, as such, features such as gasket 30 and pad 35 have not been included. FIG. 3A is a representational illustration of valve apparatus 10 in an open position. Similar to FIGS. 1 and 2, valve apparatus 10 includes tab 15 coupled to flap 20 by flexure 18. Enclosure 40 includes breather hole 45 to provide air flow between an interior or internal environment 50 and an exterior or external environment 55. Valve apparatus 10 is coupled to the outer surface of enclosure 40 by tab 15 and flap 20 is disposed above breather hole 45. A breather filter 65 may be provided beneath breather hole 45 and coupled to the interior surface of enclosure 40.

When a storage device is powered on, the temperature of the internal environment 50 rises rapidly causing an increase in internal pressure. The increase in pressure causes an outflow 53 of air from the internal environment 50 to the external environment 55 through the breather filter 65 and breather hole 45. The outflow 53 of air is expelled from the internal environment 50 and pushes the flap 20 up away from the breather hole 45. As such, when a storage device is powered on, valve apparatus 10 remains in an open position due to the outflow 53 of air and the atmospheric equilibrium between the interior 50 and exterior 55 of the enclosure is maintained.

FIG. 3B is a representational illustration of valve apparatus 10 in a closed position. When a storage device is powered off, the pressure of the internal environment 50 is reduced as the temperature decreases. The valve apparatus 10 reduces air exchange when the pressure of the internal environment 50 is lower than the external environment 55. As the internal pressure reduces, air begins to inflow 57 from the exterior environment 55 to the interior environment 50 and the flap 20 of the valve apparatus 10 falls to a closed position and covers breather hole 45. When the valve apparatus 10 is in a closed position with the flap 20 sealed against enclosure 40, air inflow 57 to the internal environment 50 is reduced as the air flows through the hole or opening 25, which is smaller than breather hole 45. Valve apparatus 10 reduces gas exchange from the exterior 55 to the interior 50 environments. This may lengthen the time for a storage device to reach atmospheric equilibrium when the internal pressure is low, such as when powered off or in a standby mode. Restricting gas exchange through opening 25 reduces the rate air from the external environment which travels through breather filter 65. By reducing gas exchange, the absorbing capacity of the breather filter 65 may be extended and less contamination from the external environment 55 is introduced to the interior 50. In one example of the embodiment, valve apparatus 10 may be seated within a recess 60 on enclosure 40. In FIGS. 3A and 3B illustrate valve apparatus 10 in recess 60 such that the top surface of valve apparatus 10 is flush with the outer surface of enclosure 40, however, the embodiment need not be so limited, and recess 60 may be included in a variety of depths and shapes to accommodate valve apparatus 10 without departing from the scope of the disclosure.

Figure 4A:
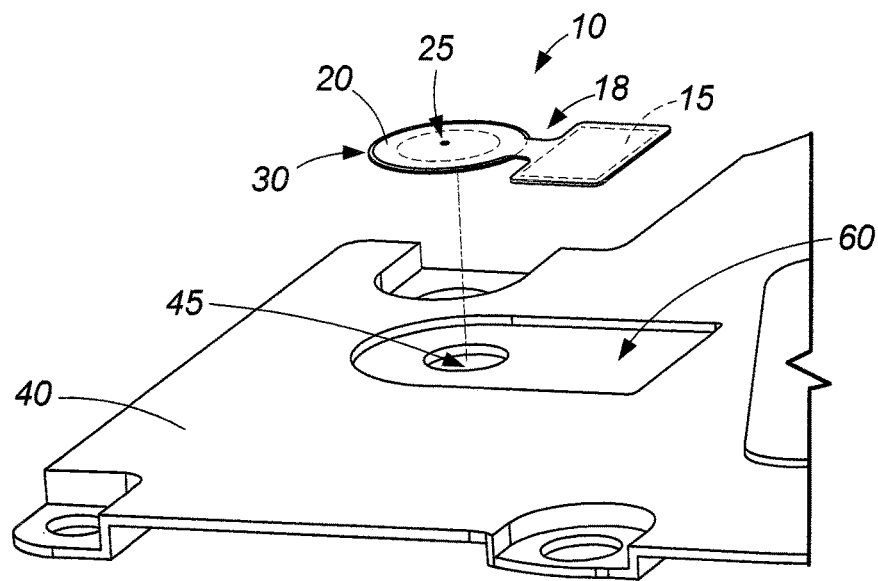
FIGS. 4A and 4B are schematic illustrations of a valve apparatus according to an embodiment of the disclosure.
Figure 4B:
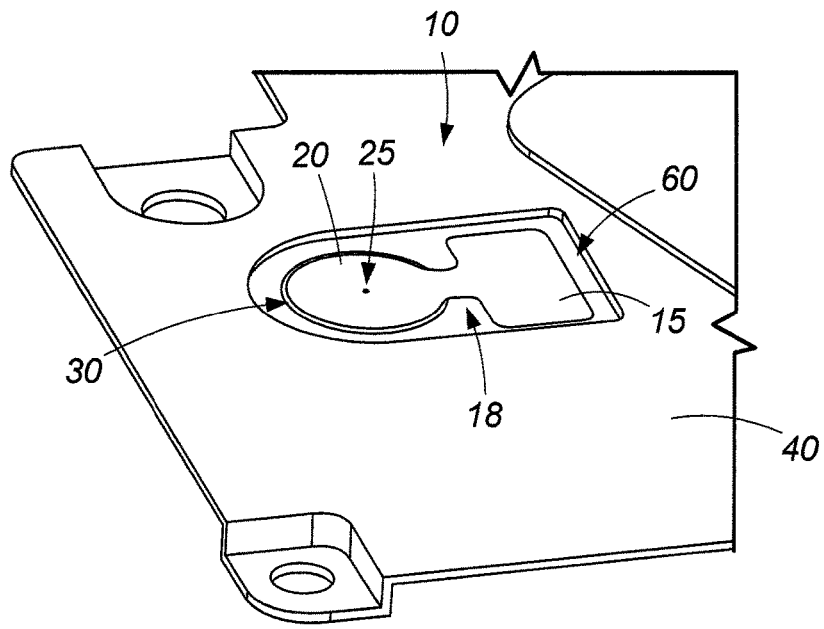

FIGS. 4A and 4B illustrate valve apparatus 10 in an example use of the present disclosure. FIG. 4A illustrates enclosure 40 of a data storage device including recess 60 for holding valve apparatus 10 over breather hole 45. Recess 60 may be configured to enable flap 20 unobstructed movement when regulating air-flow through breather hole 45. As described above, tab 15 may be secured to enclosure 40 such that flap 20 covers breather hole 45 to enable airflow selectivity between an interior and exterior of enclosure 40. Here, enclosure 40 is illustrated as one side of an overall enclosure of a data storage device and is merely representative to illustrate breather hole 45 disposed in enclosure 40. Thus, it provides an example of valve apparatus 10 disposed on an enclosure for providing airflow selectivity in a data storage device.

FIG. 4B illustrates valve apparatus 10 coupled to enclosure 40 when in a closed position. As can be seen when comparing FIG. 4B with FIG. 4A, flap 20 covers breather hole 45, and gasket 30 provides a seal between flap 20 and enclosure 40 when valve apparatus is in a closed position, e.g., when internal pressure is low. Hole, or opening 25 disposed on flap 20 is centrally located on flap 20 and thus corresponds with breather hole 45 to enable airflow between the exterior 55 and the interior 50 of the enclosure 40 when in a closed position. Although valve apparatus 10 is illustrated with a square shaped tab 15 and circular shaped flap 20, and recess 60 is correspondingly shaped to accommodate valve apparatus 10, one skilled in the art will recognize these are exemplary only, and valve apparatus 10 and recess 60 may be altered in shape or size without departing from the scope of the disclosure.

A method of providing airflow selectivity for a data storage breather structure includes providing an enclosure configured to maintain atmospheric equilibrium between an interior environment and exterior environment through a breather hole and providing a valve apparatus configured to regulate airflow through the breather hole of the enclosure. The valve may further include an opening configured to allow a reduced airflow into the enclosure when the valve is in a closed position. The method enables a storage device to quickly reach pressure equilibrium when internal pressure is high, but to reduce gas exchange when internal pressure is low. The valve apparatus placed over a breather hole may reduce the amount and rate of air passing through the breather filter. Reducing airflow may extend the breather filters' absorption capacity and reduce contamination of the enclosure's interior.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and therefore are not drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   an enclosure having a breather hole;
   a tab configured to couple to the enclosure; and
   a flap that is coupled to the tab by a flexure that enables movement of the flap against the breather hole, the flap is configured to regulate airflow through the breather hole.

2. The apparatus of claim 1, and wherein the tab is coupled to an exterior of the enclosure.

3. The apparatus of claim 1, and wherein the flap is configured to selectively engage the breather hole.

4. The apparatus of claim 1 and further comprising a pad to couple the tab to the enclosure.

5. The apparatus of claim 4, and wherein the pad comprises an adhesive.

6. The apparatus of claim 1 and further comprising a gasket coupled to the flap to enable a seal between the flap and the breather hole.

7. The apparatus of claim 1, and wherein the flap includes an opening corresponding with the breather hole when the flap is in a closed position.

8. The apparatus of claim 7, and wherein the opening is configured to allow airflow into the enclosure when the flap is in a closed position.

9. An apparatus comprising:
   a breather hole disposed on a data storage enclosure;
   a valve comprising a moveable flap that is configured to regulate airflow through the breather hole; and
   an opening in the moveable flap of the valve to enable airflow from an exterior of the data storage enclosure to an interior of the data storage enclosure.

10. The apparatus of claim 9 and further comprising a recess on an exterior of the data storage enclosure configured to hold the valve.

11. The apparatus of claim 9, and wherein the valve comprises the moveable flap coupled to a tab by a flexure.

12. The apparatus of claim 9, and wherein the valve is in an open position when internal pressure in the data storage enclosure is high.

13. The apparatus of claim 9, and wherein the valve is in a closed position when internal pressure in the data storage enclosure is low.

14. The apparatus of claim 13, and wherein the opening in the moveable flap is configured to allow airflow into the data storage enclosure when the valve is in the closed position.

15. The apparatus of claim 9, and further comprising a breather filter disposed inside the data storage enclosure beneath the breather hole.

16. A method comprising:
providing an enclosure configured to maintain atmospheric equilibrium between an interior environment and exterior environment through a breather hole; and
providing a valve having a flap that regulates airflow through the breather hole of the enclosure by selectively engaging the breather hole.

17. The method of claim 16, and wherein the flap is in an open position when internal pressure in the enclosure is high.

18. The method of claim 16, and wherein the flap is in a closed position when internal pressure in the enclosure is low.

19. The method of claim 16 and further comprising providing an opening in the flap to allow airflow into the enclosure when the flap is in a closed position.

* * * * *